Patented June 18, 1929.

1,717,567

UNITED STATES PATENT OFFICE.

GEORG KALISCHER AND HEINZ SCHEYER, OF FRANKFORT-ON-THE-MAIN, AND KARL KELLER, OF MAINKUR, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

NEW CHLORINATED ALDEHYDE OF THE AROMATIC SERIES AND PROCESS OF MAKING SAME.

No Drawing. Application filed January 30, 1928, Serial No. 250,720, and in Germany February 2, 1927.

In our copending application of the same date Serial No. 250,718 a process for introducing an aldehydic group into cyclic compounds is described consisting in acting on carbo- and heterocyclic compounds, containing a labile hydrogen atom whereas other hydrogen atoms may be replaced by halogens or other monovalent substituents, attached to a carbon atom of the ring by means of a carbon-, oxygen- or sulfur-atom, in presence of an acid agent of condensation containing chlorine with a formylaminocompound of the general formula

wherein $X_1$ and $X_2$ represent hydrogen or an alkyl-, aryl- or aralkylgroup.

Now we have found, that if cyclic compounds, in which the lability of hydrogen atom is based on the presence in their molecule of a keto- and a methylenegroup in ring binding which are capable of reacting in the tautomeric enolic form, are subjected to the aforesaid reaction new chlorinated aldehydic derivatives are obtained.

Probably the course of reaction is such a one that besides the substitution of the labile hydrogen atom by the aldehydic group the hydroxylgroup of the enolic form is replaced by chlorine. The reaction only occurs when using a formylderivative of primary or secondary amines corresponding to the formula above given, in which $X_1$ represents hydrogen or an alkyl-, aryl-, or aralkylgroup, but $X_2$ represents exclusively an alkyl-, aryl- or aralkylgroup.

As cyclic compounds suitable for our process anthrone and its nuclear substitution products, oxythionaphthenes, pyrazolones and cyclohexanone may be named.

In order to further illustrate our invention the following examples are given, the parts being by weight and all temperatures in centigrade degrees. But we wish to be understood that we are not limited to the particular conditions nor to the specific products mentioned therein.

Example 1.

Into a reaction mixture of 13,5 parts of formylmonomethylaniline and 15,3 parts of phosphorus oxychloride, 9,4 parts of 6-ethoxy-oxythionaphthene are introduced taking care, that the reaction temperature does not surpass 60°. In this case the oxythionaphthene compound seems to react in its enoltautomeric form and the chlorine containing reaction product, which is isolated in the usual manner, correspond probably to the formula:

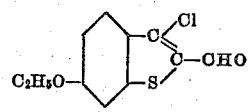

The new compound crystallizes from alcohol as brownish yellow needles, melting at about 166°, soluble in sulfuric acid with an olive-yellow color, it shows the characteristic properties of aldehydes.

In the same manner when starting from 4-methyl-6-chlorooxythionaphthen a chlorine containing aldehyde is obtained corresponding probably to the formula:

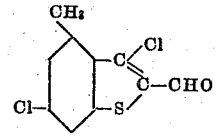

also unknown hitherto. When using formamide instead of aromatic formylaminocompounds the corresponding not chlorine containing aldehydes are obtained.

When treating in the manner as described above 1-phenyl-3-methylpyrazolone and cyklohexanone the corresponding aldehydic derivatives are obtained.

Example 2.

13,5 parts of formylmonomethylaniline and 15,3 parts of phosphorus oxychloride are mixed at ordinary temperature and 9,4 parts of anthrone are added. The intensely violet-red colored liquor is warmed for about 2 hours on the water-bath and then the mass is diluted with water. The orange-yellow precipitate is filtered, it may be purified by recrystallization from glacial acetic acid or toluene. The new chlorine containing aldehydic derivative, thus obtained corresponds probably to the formula:

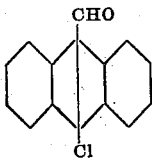

It forms bright yellow needles of about 216° melting point. It dissolves in sulfuric acid with an intense red color, it is easily soluble in the usual organic solvents in the heat. The aldehyde group can be identified by the usual reagents.

In this process with the same result formylmonomethylaniline may be replaced by the equivalent amount of e. g. formyldiphenylamine or formyl-p-toluidine or formyl-p-nitraniline.

Among the nuclear substitution products of anthrone reacting in the same manner the following may be named: 2-chloroanthrone yields 3.10-dichlor-9-anthracenealdehyde of the probable formula:

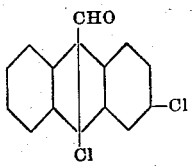

The new compound forms, when recrystallized from glacial acetic acid, yellow needles of about 174° melting point, it dissolves in sulfuric acid with a bluish red color.

1.5-dichloroanthrone yields a 1.5.10-trichloro-9-anthracenealdehyde of the probable formula:

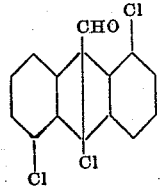

of about 197° melting point, being yellow needles from glacial acetic acid.

Desoxy-alizarine-dimethylether yields a 1,2-dimethoxy-10-chloro-9-anthracenealdehyde of the probable formula:

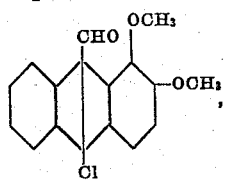

being yellow needles from glacial acetic acid, melting at about 172°, soluble in concentrated sulfuric acid with a red color. Desoxyanthraflavine-dimethylether yields the 2.6-dimethoxy-10-chloro-9-anthracenealdehyde, corresponding probably to the formula:

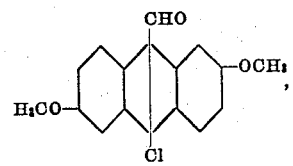

being yellow needle from glacial acetic acid, melting at about 233°, soluble in concentrated sulfuric acid with a red color.

We claim:

1. Process for introducing an aldehydic group and chlorine into cyclic compounds which process comprises acting with a formylamino compound of the general formula:

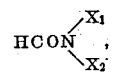

wherein $X_1$ means hydrogen or an alkyl-, aryl- or aralkylgroup, $X_2$ and alkyl-, aryl- or aralkylgroup, in presence of an acid agent of condensation containing chlorine on cyclic compounds containing a keto- and methylenegroup in ring binding and being capable of reacting in the tautomeric enolic form.

2. As new compounds anthracene aldehyde derivatives corresponding probably to the general formula:

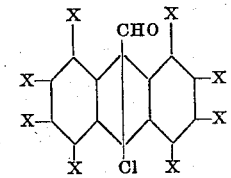

wherein X means hydrogen or a monovalent substituent, being when dry yellowish colored crystalline substances, having a definite melting point, soluble in the usual organic solvents.

3. As a new compound 10-chloro-anthracene-9-aldehyde of the probable formula:

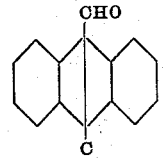

crystallizing from organic solvents as bright yellow needles, melting at about 216°, soluble in concentrated sulfuric acid with an intense red color.

In testimony whereof we affix our signatures.

GEORG KALISCHER.
HEINZ SCHEYER.
KARL KELLER.

CERTIFICATE OF CORRECTION.

Patent No. 1,717,567. Granted June 18, 1929, to

GEORG KALISCHER ET AL.

It is hereby certified that error appears in the printed specification of the above numbered patent requiring correction as follows: Page 2, in the formula, in claim 3, for "C" read "Cl"; and that the said Letters Patent should be read with this correction therein that the same may conform to the record of the case in the Patent Office.

Signed and sealed this 9th day of July, A. D. 1929.

(Seal)

M. J. Moore,
Acting Commissioner of Patents.